(12) United States Patent
Matsuyama et al.

(10) Patent No.: US 12,476,303 B2
(45) Date of Patent: Nov. 18, 2025

(54) BATTERY PACK

(71) Applicant: PRIME PLANET ENERGY & SOLUTIONS, INC., Tokyo (JP)

(72) Inventors: Satoru Matsuyama, Kasai (JP); Ryohei Honda, Himeji (JP); Naotake Yoshida, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 497 days.

(21) Appl. No.: 18/147,175

(22) Filed: Dec. 28, 2022

(65) Prior Publication Data
US 2023/0246265 A1     Aug. 3, 2023

(30) Foreign Application Priority Data
Jan. 31, 2022 (JP) .................................. 2022-012847

(51) Int. Cl.
| | |
|---|---|
| *H01M 10/6556* | (2014.01) |
| *H01M 10/613* | (2014.01) |
| *H01M 10/625* | (2014.01) |
| *H01M 10/6567* | (2014.01) |
| *H01M 50/204* | (2021.01) |

(52) U.S. Cl.
CPC ..... *H01M 10/6556* (2015.04); *H01M 10/613* (2015.04); *H01M 10/625* (2015.04); *H01M 10/6567* (2015.04); *H01M 50/204* (2021.01); *H01M 2220/20* (2013.01)

(58) Field of Classification Search
CPC ........... H01M 10/6556; H01M 10/613; H01M 10/625; H01M 10/6567; H01M 50/204; H01M 2220/20

USPC ......................................................... 429/120
See application file for complete search history.

(56) References Cited

U.S. PATENT DOCUMENTS

| | | | |
|---|---|---|---|
| 2015/0200426 A1* | 7/2015 | Maguire ............. | H01M 50/209 |
| | | | 429/120 |
| 2016/0036102 A1 | 2/2016 | Suzuki et al. | |
| 2020/0036062 A1 | 1/2020 | Hirsch et al. | |
| 2020/0403280 A1* | 12/2020 | Ness .................... | H01M 10/613 |
| 2020/0411930 A1* | 12/2020 | Park ..................... | H01M 10/625 |
| 2021/0020896 A1 | 1/2021 | Jang et al. | |
| 2021/0218082 A1 | 7/2021 | Kubota et al. | |
| 2021/0313644 A1* | 10/2021 | Jin ....................... | H01M 50/233 |

FOREIGN PATENT DOCUMENTS

| | | |
|---|---|---|
| DE | 10 2017-005315 A1 | 12/2018 |
| DE | 10 2012 221503 B4 | 1/2022 |
| EP | 2851991 B1 | 11/2018 |
| JP | 2013-025982 A | 2/2013 |
| JP | 2015-207541 A | 11/2015 |
| JP | 2021-022434 A | 2/2021 |
| WO | WO 2014/155609 A1 | 10/2014 |
| WO | WO 2019/221394 A1 | 11/2019 |

\* cited by examiner

*Primary Examiner* — James M Erwin
(74) *Attorney, Agent, or Firm* — Finnegan, Henderson, Farabow, Garrett and Dunner, LLP

(57) ABSTRACT

A battery pack includes: a plurality of stacked battery cells; and a case body that has a first bottom portion and a first side portion and that accommodates the plurality of battery cells, the first bottom portion being a portion on which the plurality of battery cells are placed, the first side portion rising from the first bottom portion. A coolant path through which coolant flows is provided inside the first side portion.

7 Claims, 7 Drawing Sheets

BATTERY PACK

This nonprovisional application is based on Japanese Patent Application No. 2022-012847 filed on Jan. 31, 2022 with the Japan Patent Office, the entire contents of which are hereby incorporated by reference.

BACKGROUND OF THE INVENTION

Field of the Invention

The present invention relates to a battery pack.

Description of the Background Art

For example, Japanese Patent Laying-Open No. 2013-25982 discloses a power supply device including: a battery block formed by stacking a plurality of prismatic batteries; a cooling plate fixed to a bottom surface of the battery block and coupled to each of the prismatic batteries in a thermal coupling state; and a cooling mechanism that cools the cooling plate.

Further, Japanese Patent Laying-Open No. 2015-207541 discloses a power storage device including: a plurality of cells; a heat conduction sheet disposed in at least one cell of the plurality of cells so as not to be in contact with a whole or part of the bottom surface of the cell; and a heat conduction paste interposed in a clearance between the heat conduction sheet and the bottom surface of the cell in which the heat conduction sheet is not in contact with the whole or part of the bottom surface of the cell.

SUMMARY OF THE INVENTION

In the power supply device disclosed in Japanese Patent Laying-Open No. 2013-25982, the cooling plate is fixed to the bottom surface of the battery block. However, since the cooling plate is provided with a coolant path through which coolant (including cooling water) circulates, the cooling plate needs to have a certain thickness or more. In this case, an overall height (overall length in the upward/downward direction) of the power supply device becomes large.

Thus, it is an object of the present invention to solve the above-described problem and to provide a battery pack having a small overall height.

A battery pack according to the present invention includes: a plurality of stacked battery cells; and a case body that has a first bottom portion and a first side portion and that accommodates the plurality of battery cells, the first bottom portion being a portion on which the plurality of battery cells are placed, the first side portion rising from the first bottom portion. A coolant path through which coolant flows is provided inside the first side portion.

According to the battery pack thus configured, since the coolant path is provided in the first side portion, the thickness of the first bottom portion in the upward/downward direction can be small. Thus, an overall height of the battery pack can be small.

Preferably, the battery pack further includes a heat conduction member interposed between each of the battery cells and the case body. The heat conduction member has a second side portion disposed between each of the battery cells and the first side portion.

According to the battery pack thus configured, heat from each of the battery cells can be efficiently conducted, via the second side portion, to the first side portion provided with the coolant path. Thus, performance of cooling the battery cells can be improved.

Preferably, an upper end portion of the second side portion is disposed above the coolant path. A lower end portion of the second side portion is disposed below the coolant path.

According to the battery pack thus configured, since the second side portion is more securely disposed between each of the battery cells and the coolant path, heat from each of the battery cells can be more efficiently conducted to the first side portion via the second side portion.

Preferably, the heat conduction member further has a second bottom portion contiguous to a lower end portion of the second side portion and disposed between each of the battery cells and the first bottom portion.

According to the battery pack thus configured, heat from each of the battery cells can be efficiently conducted, via the second bottom portion and the first bottom portion, to the first side portion provided with the coolant path. Thus, the performance of cooling the battery cells can be further improved.

Preferably, the battery pack further includes a protrusion that is disposed at a corner portion of the first bottom portion and the first side portion and that protrudes toward each of the battery cells.

According to the battery pack thus configured, a clearance in which the heat conduction member is not disposed can be prevented from being formed at the corner portion of the first bottom portion and the first side portion.

Preferably, the heat conduction member is composed of an adhesive agent that joins each of the battery cells to the case body. According to the battery pack thus configured, since the heat conduction member serves to conduct heat generated in each of the battery cells and join each of the battery cells to the case body, the battery pack can have a simple configuration.

Preferably, the first bottom portion is composed of a solid plate material. According to the battery pack thus configured, the thickness of the first bottom portion in the upward/downward direction can be smaller.

Preferably, the first side portion is composed of a frame material that extends in a stacking direction of the battery cells and that defines and forms a hollow portion. The hollow portion forms the coolant path.

According to the battery pack thus configured, since the coolant flows directly through the hollow portion defined and formed by the first side portion, the battery pack can have a simple configuration.

Preferably, the battery pack includes a plurality of cell stacks. Each of the cell stacks is constituted of the plurality of battery cells stacked in one direction. The plurality of cell stacks are arranged side by side at intervals in a direction orthogonal to the stacking direction of the battery cells. The first side portion rises from the first bottom portion toward a space between adjacent cell stacks of the plurality of cell stacks and extends in the stacking direction of the battery cells.

According to the battery pack thus configured, the battery cells can be efficiently cooled in the plurality of cell stacks while attaining a small overall height of the battery pack.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
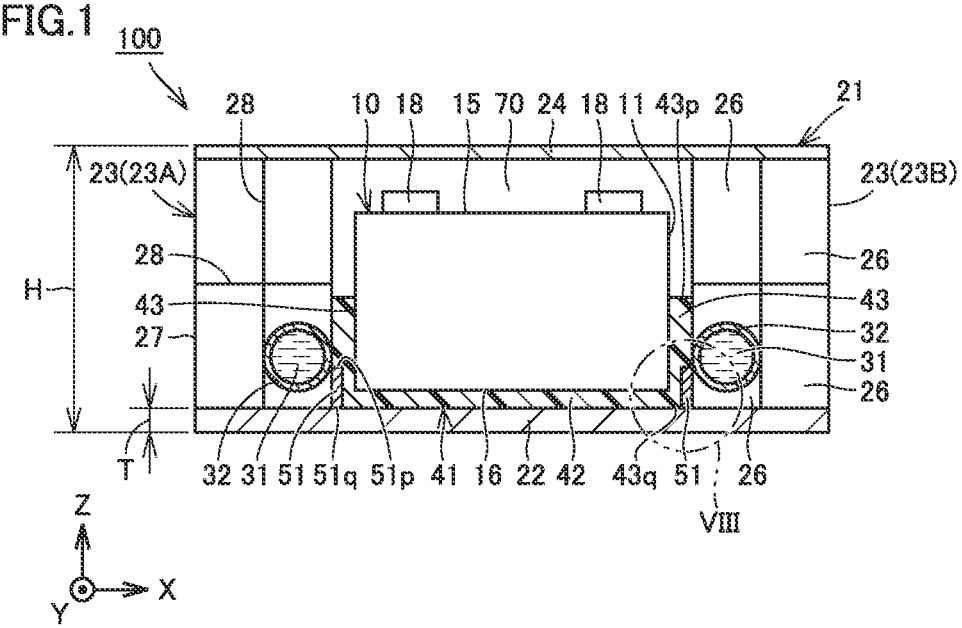
FIG. 1 is a cross sectional view showing a battery pack according to an embodiment of the present invention.

Embodiments of the present invention will be described with reference to figures. It should be noted that in the figures referred to below, the same or corresponding members are denoted by the same reference characters.

Figure 2:
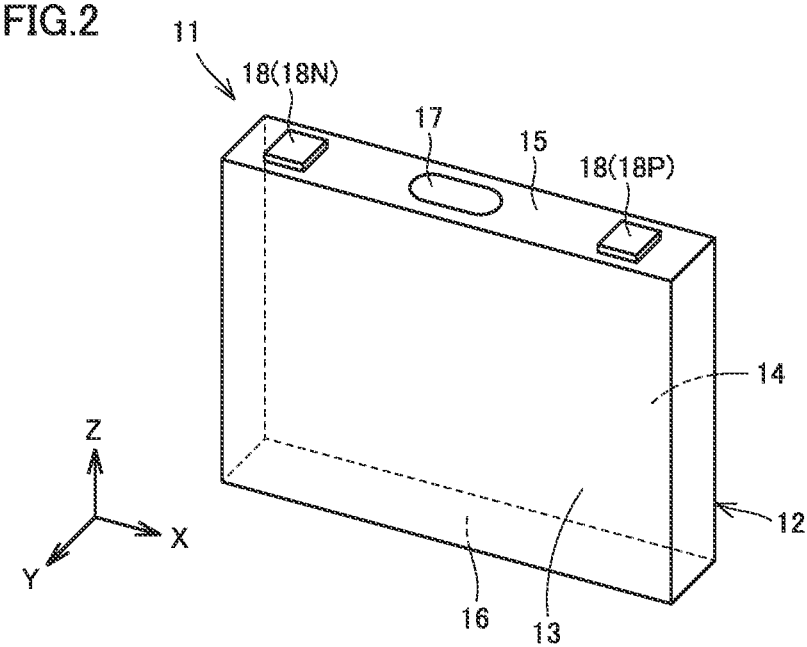
FIG. 2 is a perspective view showing a battery cell included in the battery pack in FIG. 1.
Figure 3:
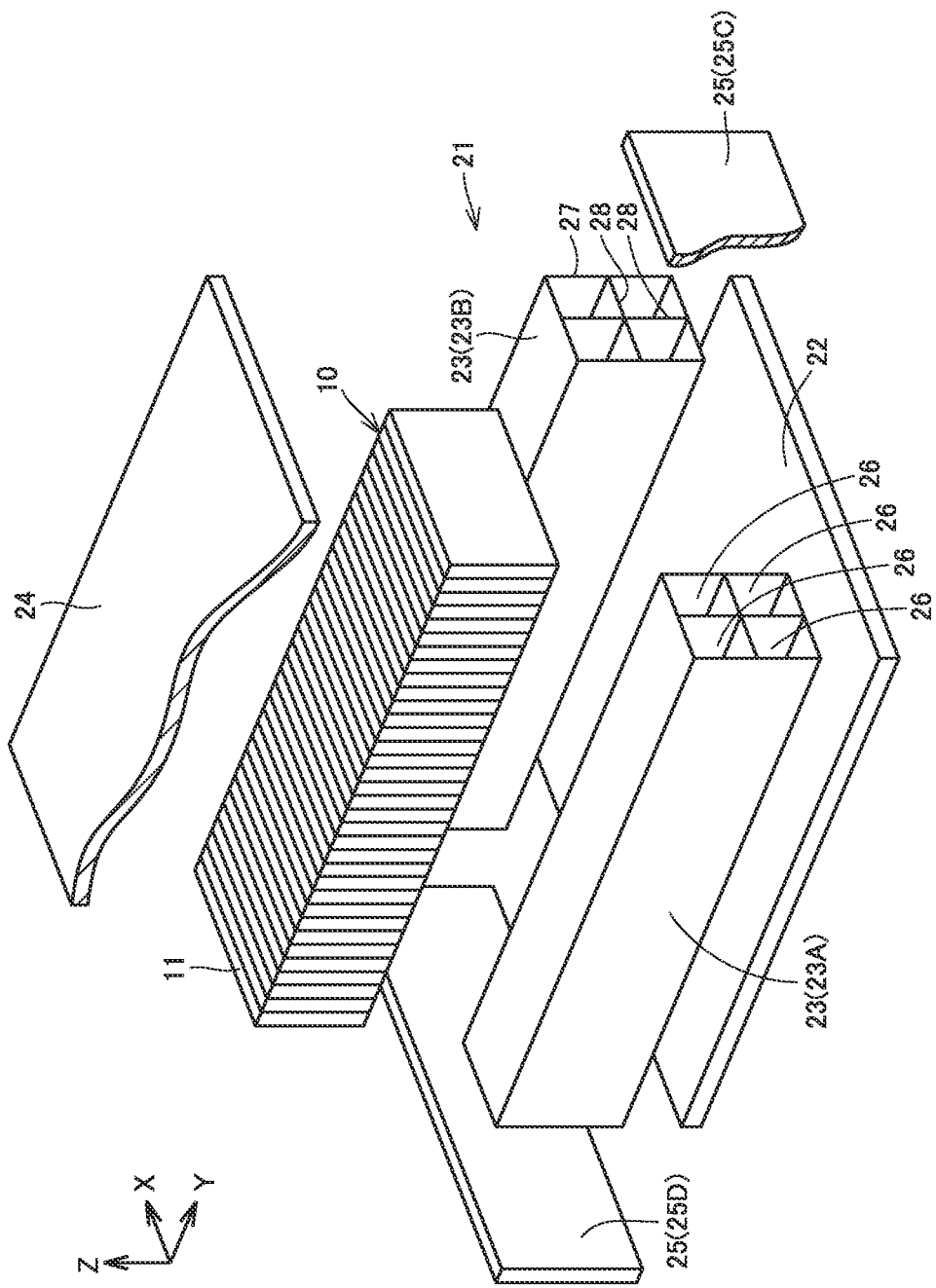
FIG. 3 is an exploded assembly diagram showing battery cells and a case body included in the battery pack in FIG. 1.

FIG. 1 is a cross sectional view showing a battery pack according to an embodiment of the present invention. FIG. 2 is a perspective view showing a battery cell included in the battery pack in FIG. 1. FIG. 3 is an exploded assembly diagram showing battery cells and a case body included in the battery pack in FIG. 1.

Referring to FIGS. 1 to 3, a battery pack 100 is used as a power supply for driving a vehicle such as a hybrid electric vehicle (HEV), a plug-in hybrid electric vehicle (PHEV), or a battery electric vehicle (BEV).

In the present specification, for convenience of explanation of a structure of a battery pack 100, a "Y axis" represents an axis extending in a stacking direction of a plurality of below-described battery cells 11 and in a horizontal direction, an "X axis" represents an axis extending in a direction orthogonal to the Y axis and in the horizontal direction, and a "Z axis" represents an axis extending in an upward/downward direction.

Battery pack 100 has a plurality of battery cells 11 and a case body 21. The plurality of battery cells 11 are stacked in the Y axis direction. Case body 21 accommodates the plurality of battery cells 11.

As shown in FIG. 2, battery cell 11 is a lithium ion battery. Battery cell 11 has a prismatic shape and has a thin plate shape in the form of a rectangular parallelepiped. The plurality of battery cells 11 are stacked such that the Y axis direction corresponds to the thickness direction of each battery cell 11.

Each of battery cells 11 has an exterior package 12. Exterior package 12 is constituted of a housing having a rectangular parallelepiped shape, and forms an external appearance of battery cell 11. An electrode assembly and an electrolyte solution are accommodated in exterior package 12.

Exterior package 12 has a first side surface 13, a second side surface 14, a top surface 15, and a bottom surface 16. Each of first side surface 13 and second side surface 14 is constituted of a flat surface orthogonal to the Y axis. First side surface 13 and second side surface 14 are oriented oppositely in the Y axis direction. Each of first side surface 13 and second side surface 14 has the largest area among the areas of the plurality of side surfaces of exterior package 12. Each of first side surface 13 and second side surface 14 has a rectangular shape. Each of first side surface 13 and second side surface 14 has a rectangular shape in which the X axis direction corresponds to the long side direction and the Z axis direction corresponds to the short side direction.

Each of top surface 15 and bottom surface 16 is constituted of a flat surface orthogonal to the Z axis. Top surface 15 is oriented upward. Bottom surface 16 is oriented downward. Top surface 15 is provided with a gas-discharge valve 17 for discharging gas generated in exterior package 12 to outside of exterior package 12 when internal pressure of exterior package 12 becomes equal to or more than a predetermined value due to the gas.

Battery cell 11 further has electrode terminals 18 including a pair of a positive electrode terminal 18P and a negative electrode terminal 18N. Electrode terminal 18 is provided on top surface 15. Positive electrode terminal 18P and negative electrode terminal 18N are provided to be separated from each other in the X axis direction. Positive electrode terminal 18P and negative electrode terminal 18N are provided on both sides beside gas-discharge valve 17 in the X axis direction.

The plurality of battery cells 11 are stacked such that first side surfaces 13 of battery cells 11, 11 adjacent to each other in the Y axis direction face each other and second side surfaces 14 of battery cells 11, 11 adjacent to each other in the Y axis direction face each other. Thus, positive electrode terminals 18P and negative electrode terminals 18N are alternately arranged in the Y axis direction in which the plurality of battery cells 11 are stacked.

Between battery cells 11, 11 adjacent to each other in the Y axis direction, positive electrode terminal 18P and negative electrode terminal 18N arranged side by side in the Y axis direction are connected to each other by a bus bar (not shown). The plurality of battery cells 11 are electrically connected to one another in series. The plurality of battery cells 11 may be electrically connected to one another in parallel or in parallel and series in combination.

The plurality of stacked battery cells 11 form a cell stack 10. Cell stack 10 has a rectangular parallelepiped shape. The length of cell stack 10 in the Y axis direction is larger than the length of cell stack 10 in the Z axis direction and is larger than the length of cell stack 10 in the X axis direction.

Case body 21 is constituted of a box body having an external appearance with a rectangular parallelepiped shape. The length of case body 21 in the Y axis direction is larger than the length of case body 21 in the Z axis direction and is larger than the length of case body 21 in the X axis direction. Case body 21 has a case bottom portion 22, first case side portions 23 (23A, 23B), second case side portions 25 (25C, 25D), and a case top portion 24. In the present embodiment, case bottom portion 22 corresponds to a "first bottom portion" in the present invention, and each of first case side portions 23 corresponds to a "first side portion" in the present invention.

Case bottom portion 22 is disposed at the bottom of case body 21. Case bottom portion 22 is composed of a plate material that has a thickness direction corresponding to the Z axis direction and that extends in the horizontal direction.

Case bottom portion 22 is composed of a solid plate material. Case bottom portion 22 is not provided with a hollow portion. The plurality of battery cells 11 are placed on case bottom portion 22. The plurality of battery cells 11 are placed on case bottom portion 22 with a below-described heat conduction member 41 (bottom portion 42) being interposed therebetween.

Each of first case side portions 23 rises from case bottom portion 22 and extends upward. First case side portion 23 has a certain width in the X axis direction and extends in the Y axis direction. First case side portion 23 is provided along a peripheral edge of case bottom portion 22 extending in the Y axis direction. First case side portion 23A and first case side portion 23B are provided to be separated from each other in the X axis direction.

Each of first case side portions 23 (23A, 23B) is composed of a frame material that defines and forms hollow portions 26. Each of hollow portions 26 extends in the Y axis direction, which is the stacking direction of the plurality of battery cells 11. When cut along an X-Z axes plane, first case side portion 23 has such a cross sectional shape that is unchanged among all the cutting positions in the Y axis direction.

More specifically, first case side portion 23 has a frame portion 27 and partition wall portions 28. When cut along the X-Z axes plane, frame portion 27 has such a cross section that frame portion 27 extends along four sides of a rectangular shape. Frame portion 27 forms an external appearance of first case side portion 23. Partition wall portions 28 are provided inside frame portion 27. Partition wall portions 28 define a space inside frame portion 27 into the plurality of hollow portions 26. Each of hollow portions 26 has an opening having a rectangular shape when viewed in the Y axis direction. The plurality of hollow portions 26 are provided side by side in the X axis direction and the Z axis direction. As an example, first case side portion 23 is composed of an aluminum extrusion material.

It should be noted that first case side portion 23 may be provided with a single hollow portion 26, or may be provided with a hollow portion 26 having a circular shape or a polygonal shape other than the rectangular shape.

Each of second case side portions 25 rises from case bottom portion 22 and extends upward. Second case side portion 25 has a certain width in the Y axis direction and extends in the X axis direction. Second case side portion 25 is provided along a peripheral edge of case bottom portion 22 extending in the X axis direction. Second case side portion 25C and second case side portion 25D are provided to be separated from each other in the Y axis direction. Second case side portion 25C and second case side portion 25D are provided on both sides beside the plurality of battery cells 11 stacked in the Y axis direction. The plurality of battery cells 11 are restrained by second case side portion 25C and second case side portion 25D in the Y axis direction.

First case side portions 23 and second case side portions 25 extend along the peripheral edges of case bottom portion 22. Space 70 is defined at a position located above case bottom portion 22 and surrounded by first case side portions 23 and second case side portions 25 so as to be open upward and accommodate the plurality of battery cells 11 (cell stack 10).

Case top portion 24 is disposed to face case bottom portion 22 in the Z axis direction. Case top portion 24 is detachably attached to upper end portions of first case side portions 23 and second case side portions 25 and serves as a cover body to close the opening of space 70.

Case bottom portion 22, first case side portions 23, second case side portions 25 and case top portion 24 are constituted of separate members, and are combined together to form case body 21. The case body of the present invention is not limited to such a configuration, and for example, the first case bottom portion and the first case side portions may be constituted of one member.

A coolant path 31 is provided inside first case side portion 23 (23A, 23B). Coolant path 31 is provided inside frame portion 27 that forms the external appearance of first case side portion 23. Coolant path 31 allows coolant (for example, cooling water) to flow therethrough. Coolant path 31 allows the coolant to flow in the Y axis direction.

Coolant path 31 is provided adjacent to the plurality of battery cells 11 (cell stack 10) in the X axis direction. Coolant path 31 extends between one end and the other end of the plurality of battery cells 11 in the Y axis direction.

Battery pack 100 further has a tube member 32. Tube member 32 is disposed in a hollow portion 26. Tube member 32 is disposed in a hollow portion 26 positioned adjacent to battery cells 11 in the X axis direction and just above case bottom portion 22 in the Z axis direction among the plurality of hollow portions 26. Tube member 32 extends in the Y axis direction. Tube member 32 is provided in contact with the inner wall of first case side portion 23 that defines hollow portion 26. Coolant path 31 is constituted of tube member 32.

Figure 4:
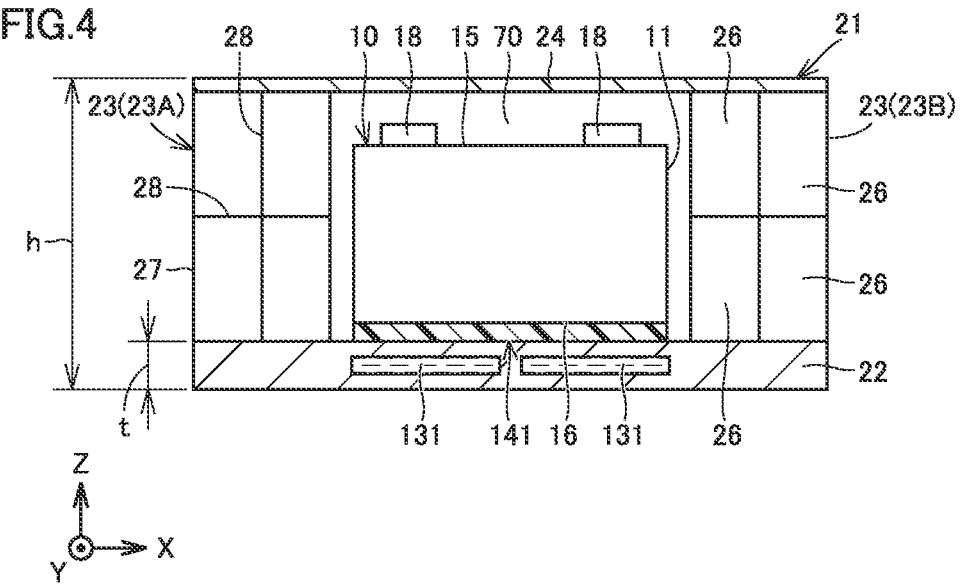
FIG. 4 is a cross sectional view showing a battery pack according to a comparative example.

FIG. 4 is a cross sectional view showing a battery pack according to a comparative example. Referring to FIG. 4, in the comparative example, a coolant path 131 is provided instead of coolant path 31 (tube member 32) in FIG. 1. Coolant path 131 is provided inside case bottom portion 22. In such a configuration, since coolant path 131 extends in case bottom portion 22, thickness t of case bottom portion 22 becomes large. This leads to a large overall height h of the battery pack, with the result that energy density with respect to the volume of the battery pack may be decreased and mountability of the battery pack onto a vehicle may be decreased.

Referring to FIGS. 1 to 3, in contrast, in battery pack 100 according to the present embodiment, coolant path 31 (tube member 32) is provided inside first case side portion 23. With such a configuration, since thickness T of case bottom portion 22 can be small, overall height H of battery pack 100 can be small.

The following continuously describes the structure of battery pack 100. Battery pack 100 further has heat conduction member 41.

Heat conduction member 41 is interposed between each of battery cells 11 and case body 21. Heat conduction member 41 is interposed between each of the plurality of battery cells 11 (cell stack 10) and case body 21. Heat conduction member 41 is provided to extend between one end and the other end of the plurality of battery cells 11 (cell stack 10) in the Y axis direction.

Heat conduction member 41 has a bottom portion 42 and side portions 43. In the present embodiment, bottom portion 42 corresponds to a "second bottom portion" in the present invention, and each of side portions 43 corresponds to a "second side portion" in the present invention. Bottom portion 42 is disposed between each of battery cells 11 (bottom surface 16) and case bottom portion 22. Each of side portions 43 is disposed between each of battery cells 11 and first case side portion 23 (23A, 23B). Bottom portion 42 is contiguous to a lower end portion 43q of side portion 43.

An upper end portion 43p of side portion 43 is disposed above coolant path 31 (tube member 32). Upper end portion 43p of side portion 43 is disposed above a contact position of tube member 32 with first case side portion 23. Lower end portion 43q of side portion 43 is disposed below coolant path 31 (tube member 32).

Heat conduction member 41 is composed of a material having a heat conductivity higher than that of air. Heat conduction member 41 is composed of, for example, a gap filler. Heat conduction member 41 has fluidity during assembling of battery pack 100, and is hardened when left at room temperature or when heated.

Heat conduction member 41 is composed of a resin such as acrylic, urethane, or silicone. Heat conduction member 41 may be an adhesive agent that joins battery cells 11 to case body 21.

According to such a configuration, since side portion 43 of heat conduction member 41 is disposed between battery cell 11 and first case side portion 23, heat from battery cell 11, which emits heat, can be efficiently conducted through side portion 43 to first case side portion 23 including coolant path 31 (tube member 32). Thus, performance of cooling battery cells 11 can be improved. In this case, since upper end portion 43p of side portion 43 is disposed above coolant path 31 and lower end portion 43q of side portion 43 is disposed below coolant path 31, side portion 43 can be disposed more securely on a path of conduction of heat from battery cell 11 to coolant path 31. Further, since heat conduction member 41 has bottom portion 42 disposed between battery cell 11 and case bottom portion 22, heat from battery cell 11 can be conducted to first case side portion 23 through bottom portion 42 and case bottom portion 22. Thus, the performance of cooling battery cells 11 can be further improved.

When heat conduction member 41 is an adhesive agent, battery cell 11 can be fixed to case body 21 by using heat conduction member 41 for improving heat conduction from battery cell 11.

Battery pack 100 further has protrusions 51. Protrusions 51 are disposed at corner portions of case bottom portion 22 and first case side portions 23 (23A, 23B). Protrusions 51 protrude toward battery cells 11. Each of protrusions 51 extends in the Y axis direction. Protrusion 51 has a rectangular shape when viewed in the Y axis direction. An upper end portion 5'p of protrusion 51 is disposed above bottom surface 16 of battery cell 11. Upper end portion 51p of protrusion 51 is disposed below the contact position of tube member 32 with first case side portion 23. A lower end portion 51q of protrusion 51 is disposed below bottom surface 16 of battery cell 11.

Figure 5:
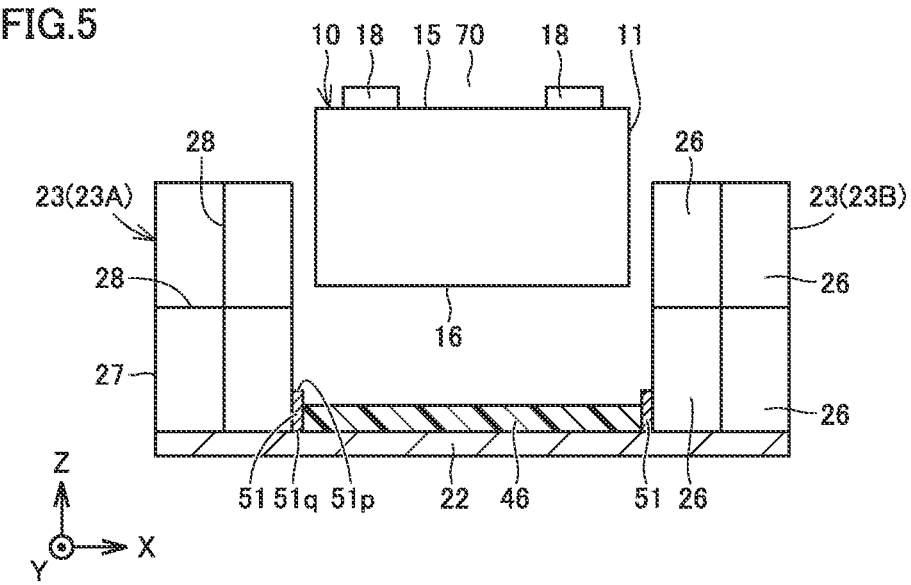
FIG. 5 is a cross sectional view showing a first step during assembling of the battery pack in FIG. 1.
Figure 6:
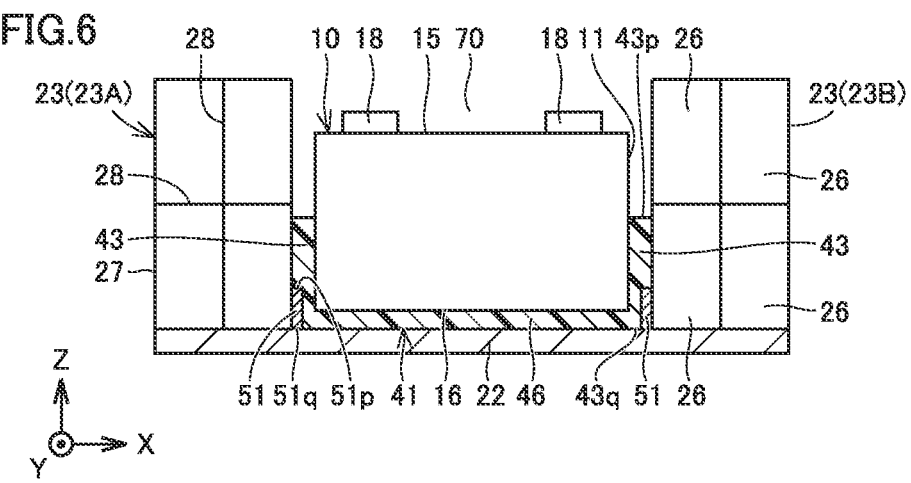
FIG. 6 is a cross sectional view showing a second step during assembling of the battery pack in FIG. 1.

Each of FIG. 5 and FIG. 6 is a cross sectional view showing a step during assembling of the battery pack in FIG. 1. Referring to FIG. 5, a heat conduction material 46 having flowablility is disposed in space 70. Heat conduction material 46 is disposed to have a certain height from case bottom portion 22. Referring to FIG. 6, next, the plurality of battery cells 11 (cell stack 10) are disposed in space 70. By soaking the bottom portion of cell stack 10 in heat conduction material 46, heat conduction material 46 on case bottom portion 22 flows out to a space beside cell stack 10. On this occasion, heat conduction material 46 can be smoothly guided to the space beside cell stack 10 by protrusions 51 disposed at the corner portions of case bottom portion 22 and first case side portions 23. Further, since a clearance between each protrusion 51 and cell stack 10 in the X axis direction is small, an amount of flow of heat conduction material 46 toward the space beside cell stack 10 can be increased.

Then, heat conduction material 46 is hardened to form heat conduction member 41 having bottom portion 42 and side portions 43. It should be noted that with protrusions 51, a sealing characteristic between case bottom portion 22 and each of first case side portions 23 can be improved and the plurality of battery cells 11 can be more precisely aligned in the Y axis direction while ensuring a distance between each of first case side portions 23 and each of battery cells 11.

Figure 7:
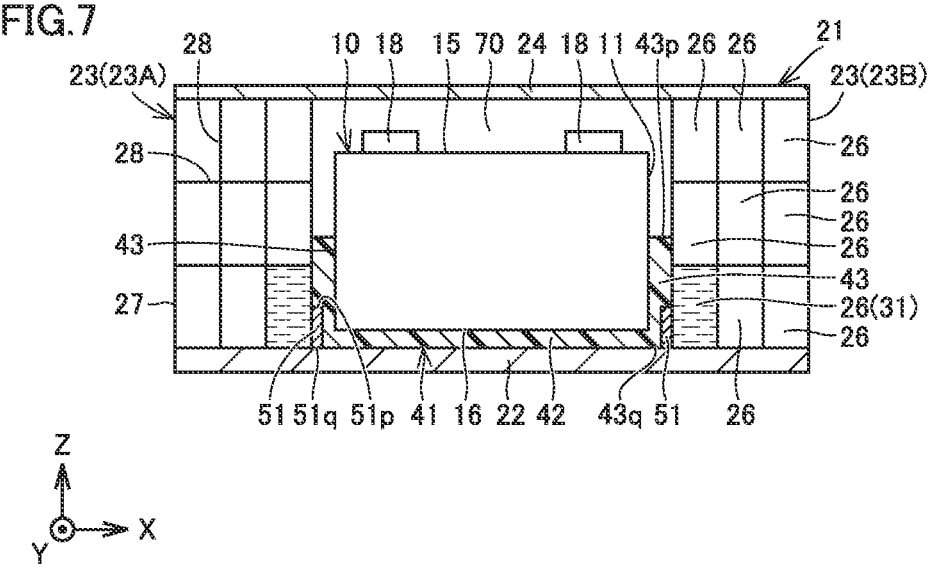
FIG. 7 is a cross sectional view showing a first modification of the battery pack (coolant path) in FIG. 1.

Next, various modifications of battery pack 100 will be described. FIG. 7 is a cross sectional view showing a first modification of the battery pack (coolant path) in FIG. 1. Referring to FIG. 7, in the present modification, tube member 32 in FIG. 1 is not provided in hollow portion 26, and hollow portion 26 constitutes coolant path 31 through which coolant flows. According to such a configuration, the number of components of the battery pack can be reduced.

Figure 8:
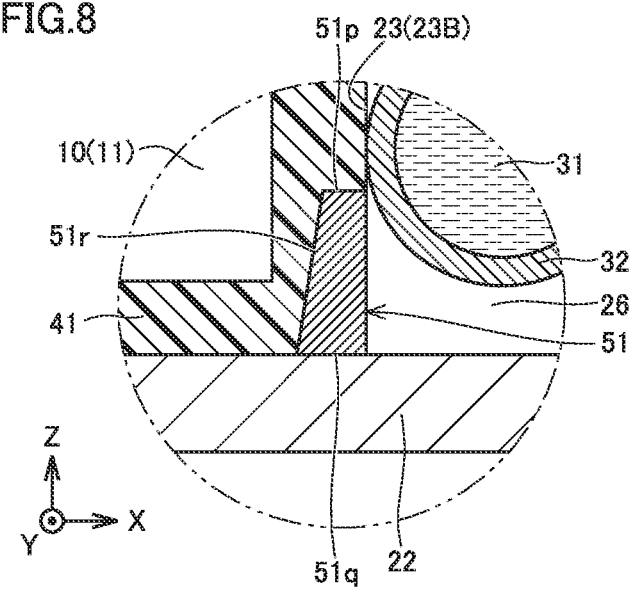
FIG. 8 is a cross sectional view showing a second modification of the battery pack (protrusion) in FIG. 1.
Figure 9:
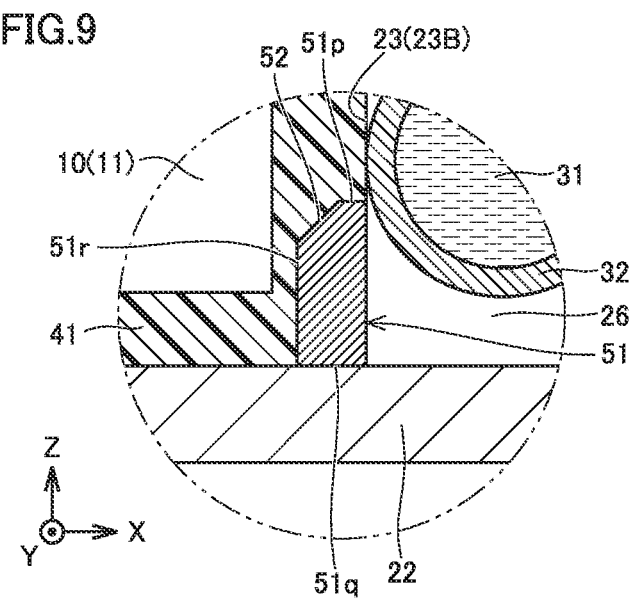
FIG. 9 is a cross sectional view showing a third modification of the battery pack (protrusion) in FIG. 1.
Figure 10:
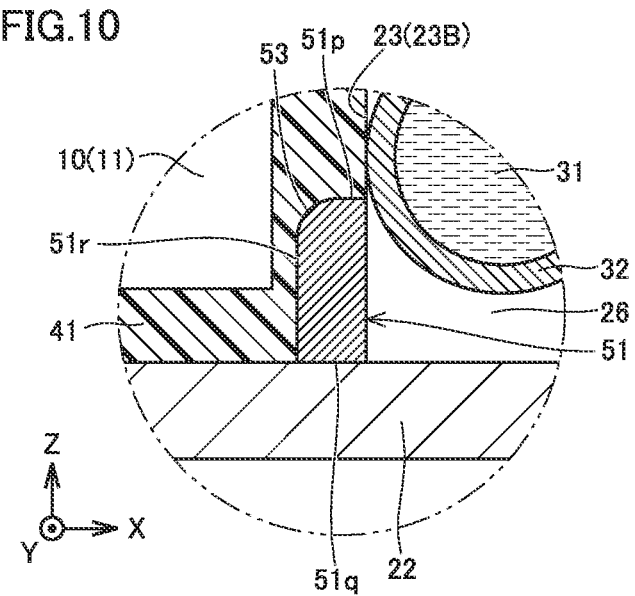
FIG. 10 is a cross sectional view showing a fourth modification of the battery pack (protrusion) in FIG. 1.

FIGS. 8 to 10 are cross sectional views showing second to fourth modifications of the battery pack (protrusion) in FIG. 1. Each of FIGS. 8 to 10 shows a cross section of the battery pack corresponding to a range surrounded by a chain double-dashed line VIII in FIG. 1.

Referring to FIG. 8, in the present modification, a side portion 51r of protrusion 51 facing battery cell 11 in the X axis direction is constituted of a tapered surface inclined with respect to the Z axis direction (upward/downward direction). The width of protrusion 51 in the X axis direction is smaller in a direction from lower end portion 51q toward upper end portion 51p. Referring to FIG. 9, in the present modification, a chamfered portion 52 constituted of a flat surface is provided at a corner portion of side portion 51r and upper end portion 51p. Referring to FIG. 10, in the present modification, a chamfered portion 53 constituted of a curved surface is provided at a corner portion of side portion 51r and upper end portion 51p.

According to these modifications, during the step of disposing the plurality of battery cells 11 (cell stack 10) in space 70, cell stack 10 is smoothly guided by protrusions 51 to a position just above case bottom portion 22. Therefore, the step of disposing the plurality of battery cells 11 in space 70 can be performed readily. Further, by providing each of chamfered portions 52, 53 shown in FIGS. 9 and 10 in protrusion 51, each of battery cells 11 (particularly, an insulating sheet material that covers exterior package 12 of battery cell 11) can be suppressed from being broken due to contact with protrusion 51.

Figure 11:
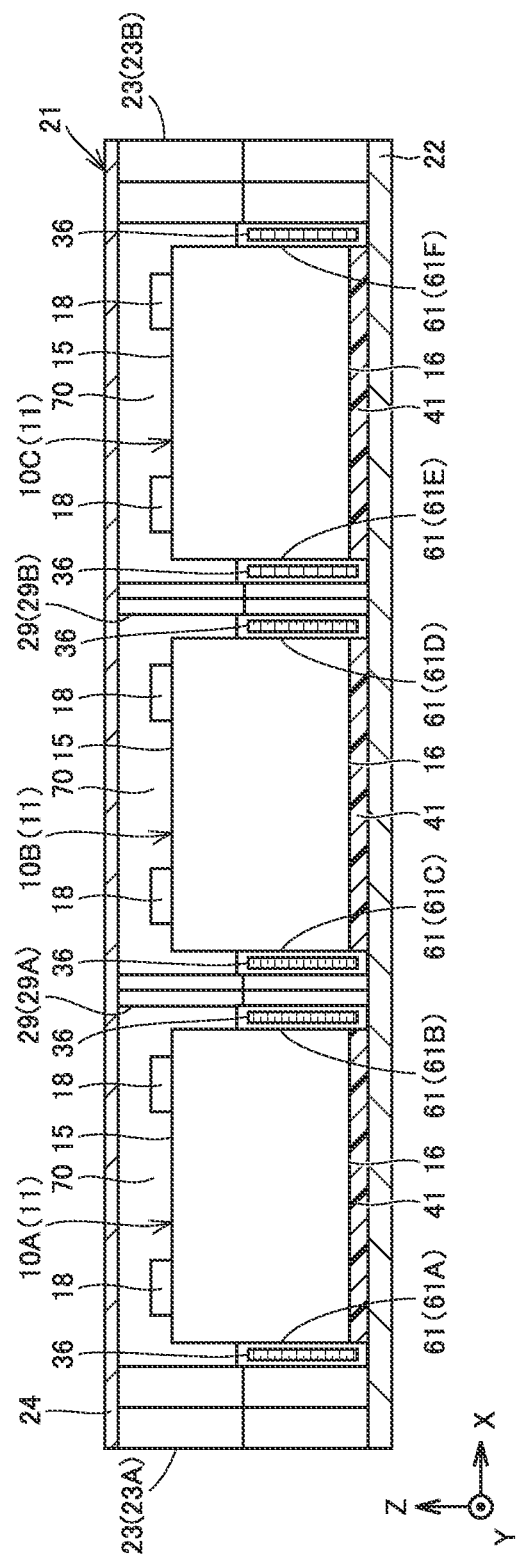
FIG. 11 is a cross sectional view showing a fifth modification of the battery pack in FIG. 1.

FIG. 11 is a cross sectional view showing a fifth modification of the battery pack in FIG. 1. Referring to FIG. 11, in the present modification, a plurality of cell stacks 10 (10A, 10B, 10C) are arranged side by side at intervals in the X axis direction orthogonal to the Y axis direction. Case body 21 further has first frames 29 (29A, 29B) and second frames 61 (61A, 61B, 61C, 61D, 61E, 61F). In the present modification, each of second frames 61 corresponds to the "first side portion" in the present invention.

Each of first frames 29 has the same frame structure as that of first case side portion 23, and is provided on case bottom portion 22 to extend upward. First frame 29A extends in the Y axis direction in a space between cell stack 10A and cell stack 10B. First frame 29B extends in the V axis direction in a space between cell stack 10B and cell stack 10C.

Each of second frames 61 is composed of a frame material that rises from case bottom portion 22 and that extends in the Y axis direction. Second frame 61A is interposed between first case side portion 23A and cell stack 10A. Second frame 61B and second frame 61C rise from case bottom portion 22 toward the space between cell stack 10A and cell stack 10B. Second frame 61B is interposed between cell stack 10A and first frame 29A, and second frame 61C is interposed between first frame 29A and cell stack 10B. Second frame 61D and second frame 61E rise from case bottom portion 22 toward the space between cell stack 10B and cell stack 10C. Second frame 61D is interposed between cell stack 101B and first frame 29B, and second frame 61E is interposed between first frame 29B and cell stack 10C. Second frame 61F is interposed between cell stack 10C and first case side portion 23B.

A coolant path 36 is provided inside each of second frames 61 (61A, 61B, 61C, 61D, 61E, 61F). Coolant path 36 extends in the Y axis direction. With such a configuration, battery cells 11 can be efficiently cooled in the plurality of cell stacks 10 while attaining a small overall height of the battery pack.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery pack comprising:
a plurality of stacked battery cells;
a case body that has a first bottom portion and a first side portion and that accommodates the plurality of battery cells, the first bottom portion being a portion on which the plurality of battery cells are placed, the first side portion rising from the first bottom portion; and
a heat conduction member interposed between each of the battery cells and the case body, wherein
the heat conduction member has a second side portion disposed between each of the battery cells and the first side portion,
a coolant path through which coolant flows is provided inside the first side portion, and
the heat conduction member further has a second bottom portion contiguous to a lower end portion of the second side portion and disposed between each of the battery cells and the first bottom portion.

2. The battery pack according to claim 1, wherein
an upper end portion of the second side portion is disposed above the coolant path, and
the lower end portion of the second side portion is disposed below the coolant path.

3. The battery pack according to claim 1, further comprising a protrusion that is disposed at a corner portion of the first bottom portion and the first side portion and that protrudes toward each of the battery cells.

4. The battery pack according to claim 1, wherein the heat conduction member is composed of an adhesive agent that joins each of the battery cells to the case body.

5. The battery pack according to claim 1, wherein the first bottom portion is composed of a solid plate material.

6. The battery pack according to claim 1, wherein
the first side portion is composed of a frame material that extends in a stacking direction of the battery cells and that defines and forms a hollow portion, and
the hollow portion forms the coolant path.

7. The battery pack according to claim 1, comprising a plurality of cell stacks, wherein
each of the cell stacks is constituted of the plurality of battery cells stacked in one direction,
the plurality of cell stacks are arranged side by side at intervals in a direction orthogonal to the stacking direction of the battery cells, and
the first side portion rises from the first bottom portion toward a space between adjacent cell stacks of the plurality of cell stacks and extends in the stacking direction of the battery cells.

* * * * *